April 22, 1969  H. SABET  3,439,549
TRANSMISSION WITH AUTOMATICALLY VARYING RATIO
Filed Oct. 20, 1967

INVENTOR
Huschang Sabet
BY
Michael E. Strikker
ATTORNEY

United States Patent Office 3,439,549
Patented Apr. 22, 1969

3,439,549
TRANSMISSION WITH AUTOMATICALLY VARYING RATIO
Huschang Sabet, 67 Eduard-Pfeiffer-Strasse, 7 Stuttgart-Nord, Germany
Filed Oct. 20, 1967, Ser. No. 676,983
Claims priority, application Germany, Oct. 20, 1966, S 106,606
Int. Cl. F16h 27/04; F02b 53/00, 55/00
U.S. Cl. 74—70                10 Claims

ABSTRACT OF THE DISCLOSURE

A first shaft is connected with a first rotary piston, and a second shaft is connected with a second rotary piston. A slide block rotated about a circular path by the first shaft supports a motion transmitting member for rocking and sliding movement, the motion transmitting member having one end guided along a non-circular endless path, and another end pivotally connected with a crank driven by the second shaft which rotates the respective piston at a varying speed relative to the other piston so that the pistons form expanding and contracting chambers and the shafts are driven when a combustible fuel is ignited in the working chamber.

Background of the invention

It is known to connect an engine having two rotary pistons which form a working chamber to a transmission effecting relative angular movement of the pistons during each revolution so that the working chamber is expanded and contracted. The engine may operate in four steps, namely sucking of a fuel-air mixture, compression, ignition, and expansion with exhaust of the burned combustion gases. The working chamber is bounded by the trailing wall of one rotary piston, by the leading wall of the second piston which trails the first piston, and by sectors of the housing walls. Since during the above described operational steps the volume of the working chamber must change, the two pistons must move relative to each other while rotating which requires at least one piston to move at a non-uniform varying speed during each revolution. This is accomplished by a transmission between the shafts of the two rotary pistons.

In accordance with prior art, the transmission comprises a crank shaft driving one rotary piston at a uniform speed, and the other rotary piston through a connecting rod, while a stationary pinion meshes with a gear rotating with the crank shaft. This construction has the disadvantage that balancing of the rotating masses is required so that the total weight of the machine is increased, and a great deal of space is required.

Other known transmissions serving the above-explained purpose comprise planetary and differential gears which are manufactured at high cost.

Summary of the invention

It is one object of the invention to overcome the disadvantages of transmissions used for driving two rotary pistons at different and varying speeds, and to provide an inexpensively manufactured, compact, and reliably operating transmisison for this purpose.

Another object of the invention is to provide a transmission having a transmission ratio which automatically varies during each revolution.

Another object of the invention is to provide a transmission which can be connected with a rotary piston engine of the above-described type without requiring substantial structural changes.

With these objects in view, the present invention mainly relates to a transmisison whose ratio varies automatically during each revolution of the shaft by which the transmission is driven.

One embodiment of the invention comprises first rotary means, preferably including a first shaft; slid block means mounted on the first rotary means for angular movement about a second axis radially spaced from the first axis so that the slide block means moves along a circular path; a motion-transmitting member mounted in the slide block means for angular rocking movement with the same, and for straight rectilinear movement relative to the same; a follower means at one end and joint means at the other end of the motion-transmitting member; guide means for guiding the follower means along a non-circular endless path surrounding the first axis; and second rotary means, preferably including a hollow shaft rotatable about the first axis and pivotally connected with the joint means radially spaced from the first axis.

During rotation of the first shaft, the follower means is moved by the guide means toward and away from the first axis during each revolution of the first shaft so that the motion-transmitting member is rocked, and rotates the second shaft at a varying speed relative to the first shaft during each revolution of the same.

As explained above, this transmisison is advantageously used with an engine having two rotary piston means each of which may include two diametrically arranged rotary pistons. The first and second rotary piston means of the engine are respectively connected with the first and second rotary means of the transmission and form between each other a working chamber expanding and contracting in accordance with the relative rotary movement of the first and second rotary means. The first and second pistons are driven apart by fluid power means, such as a fuel-air mixture ignited by igniting means.

The construction of the invention avoids a crank shaft, and balancing weights, and requires no gears so that the construction is simple, compact and inexpensive. Furthermore, a small number of movable parts is required so that the span of life of the transmission is long.

The relative speed variations between the two rotary pistons can be selected by choosing the shape of the non-circular endless path, which may have the shape of different ellipses, but it is also possible to adjust the length of the motion-transmitting member while maintaining the same shape of the non-circular path so that the motion-transmitting member is rocked different angles, resulting in different relative speed variations between the first and second rotary means, and the first and second rotary pistons of the ingine, respectively.

In the preferred embodiment of the invention, the motion-transmitting member is a rocking arm whose center portion is mounted in a bore of the slide block means, and which has one end connected by a joint to a crank arm forming a part of the second rotary means, and an outer end carrying a roller guided along a non-circular endless wall, or between two parallel guide walls.

In the preferred embodiment of the invention, two slide blocks, and two motion-transmitting means guided in the slide blocks for rocking and rectilinear movement are provided, and connected by two joints to the ends of a pair of diametrically arranged crank arms. The arrangement is such that the rocking arm of the two motion-transmitting means are parallel to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

*Description of the preferred embodiments*

Figure 1A:
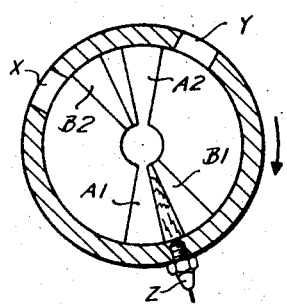
FIGS. 1a, 1b, 1c and 1d are schematic cross-sectional views illustrating consecutive operational positions of a rotary piston combustion engine.

Referring now to the drawings, and particularly to FIGS. 1a–1d, a rotary piston engine comprises two rotary piston means, each comprising diametrically disposed piston vanes A1, A2 and B1, B2, which in the initial position shown in FIG. 1a define a small sector-shaped working chamber between the circular side walls of the housing and within a circular housing wall having an outlet X and an inlet Y. An igniting means Z is mounted on the cylindrical housing wall in a position located adjacent the working chamber in the initial position of FIG. 1a.

Figure 1B:
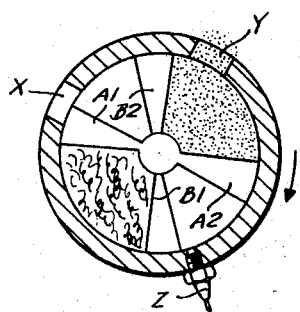
Figure 1C:
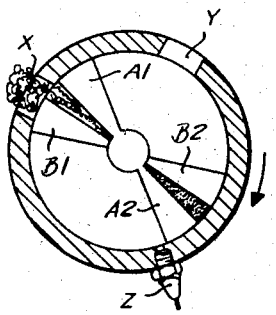
Figure 1D:
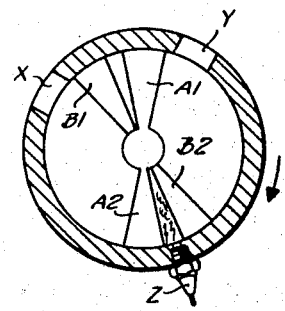

After ignition has taken place, and the previously compressed fuel-air mixture has been ignited in the small contracted working chamber, piston A1 is driven in clockwise direction to the position shown in FIGS. 1a–1d, and drives through a transmission in a manner which will be explained hereinafter in greater detail, pistons B1, B2 to move a smaller angle so that the working chamber between pistons A1 and B1 is substantially greater in the position of FIG. 1b than in the position of FIG. 1a. Simultaneously, a new fuel-air mixture is drawn through inlet Y into the expanding chamber between pistons A2 and B2. Piston A1 uniformly advances in clockwise direction and is followed by the piston B1 which is now accelerated so as to again reduce the working chamber between pistons A1 and B1 at the moment in which it passes the outlet X so that the burned combustion gases are discharged, as shown in FIG. 1c. At the same time, the fuel mixture supplied to inlet Y is compressed in the working chamber between pistons A2 and B2 and further movement of the pistons at substantially the same speed brings the contracted working chamber between pistons A2, B2 into the region of the igniting means so that the compressed fuel-air mixture is ignited and expands so that the operations are repeated by pistons A2, B2 as described above for pistons A1, B1.

The above-described rotary piston engine is not an object of the present invention, and different modified piston engines may be substituted and used together with the transmission means of the invention.

Figure 2:
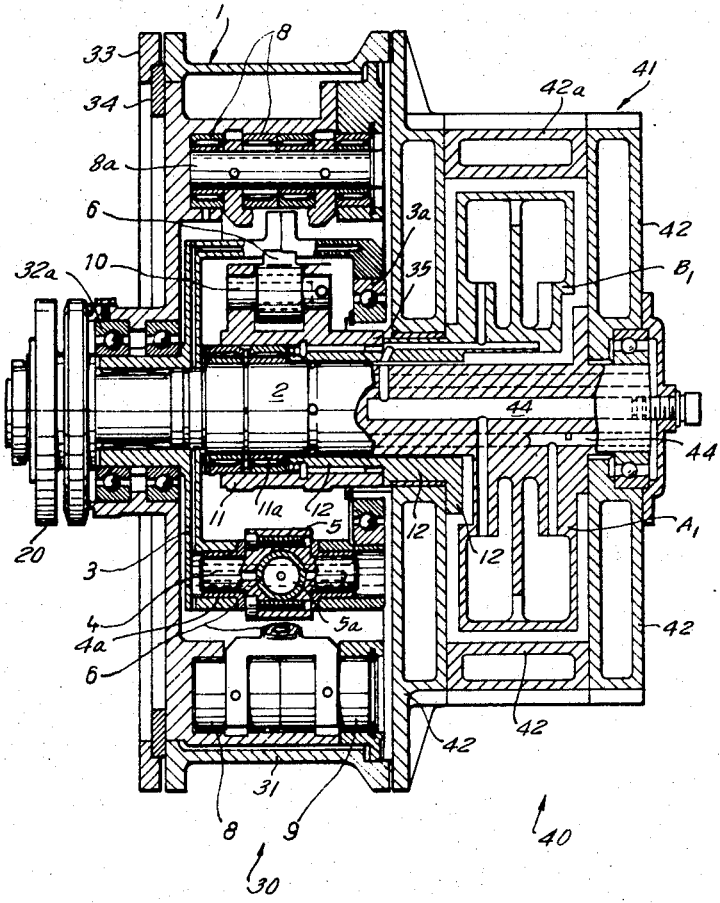
FIG. 2 is an axial sectional view of a rotary piston engine combined with a transmission according to the present invention.

FIG. 2 illustrates a transmission 30 according to the invention in combination with a rotary piston engine 40. Transmission 30 has a substantially cylindrical housing 1 including an outer annular wall 31, an end wall 32 having a bearing 32a for a first shaft 2, a sealing ring 34, and a clamping ring 33 for clamping the sealing ring 34 to cover the gap between the cylindrical wall 31 and the side wall 32. Shaft 2 is extended into the housing 41 of the rotary piston engine and supported in a bearing carried by an outer hollow wall 42, another hollow wall 42 being provided to close the housing 1 of the transmission. A cylindrical outer wall 42a is located between the side walls 42 and forms with the same a housing 41. Two piston means as described with reference to FIGS. 1a–1d are located in the housing 41, only pistons A1 and B2 being visible in the section of FIG. 2. Rotary piston A1, and the corresponding rotary piston A2, not shown, are carried by shaft 2, while rotary pistons B1, B2, not shown, are mounted on a hollow shaft 12 which surrounds a part of the inner shaft 2. The shafts are provided with channels 44 for cooling or lubricating medium, and cooling water may be held in the cavities of the hollow housing walls.

Figure 3:
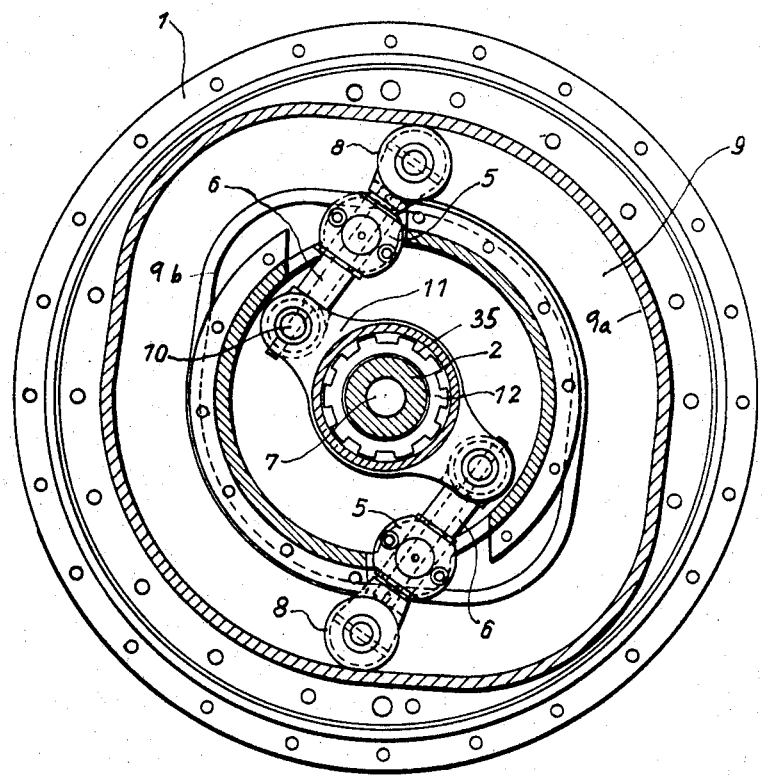
FIG. 3 is a cross section of the transmission shown in FIG. 2.

As shown in FIGS. 2 and 3, a drum-shaped member 3 is secured to an end portion of shaft 2 and rotates with the same. The drum-shaped member 3 has an opening supported on a stationary ball bearing 3a, and has at diametrically arranged points bearings 4a in which shaft portions 4 of slide blocks 5 are mounted, so that the slide block means 4, 5 rotate along a circular path about the axis of shaft 2 when the same rotates, while each slide block 5 is angularly displaceable about a second axis radially spaced from the axis of shaft 2 and defined by the shaft portion 4.

A double crank 11 has a hub portion connected by key means 35 with the end portion of shaft 12 which is located in housing 1, while another part of the hub portion is separated by a needle bearing 11a from shaft 2. The ends of crank arms 11 are connected by joint means including a pivot pin 10, to the inner ends of a pair of motion-transmitting members or arms 6 which have cylindrical portions guided in bores 5a in slide blocks 5 so that motion-transmitting arms 6 are guided in the slide blocks for longitudinal movement, but can also rock with the slide blocks and shaft portions 4 in bearings 4a.

The outer ends of the motion-transmitting members 6 are bifurcated and carry pins 8a on which rollers 8 in the form of needle bearings are mounted.

Rollers 8 are follower rollers guided in an endless noncircular guide means 9 which includes an endless outer wall 9a having two pairs of wall portions of different radius of curvature, and an inner guide wall 9b parallel to guide wall 9a.

An output or coupling means 20 is secured to the free end of shaft 2, and may be used to connect the same to a driven shaft, for example to the main drive shaft of an automobile.

*Operation*

Assuming that the output coupling means 20 on shaft 2 is subjected to a load torque, for example, by being coupled to the main drive shaft of an automobile, shaft 2 will be rotated by the rotary pistons A1, A2 at a substantially uniform speed. During rotation of shaft 2, slide blocks 5 move along a circular path with the drum-shaped member 3. The follower rollers 8 are constrained to move between the two endless guide walls 9a and 9b in a noncircular guideway which has a pair of portions farther spaced from the axis of shaft 2 and two portions closer to shaft 2. Consequently, follower rollers 8 will move toward and away from the main axis of the transmission with motion transmitting rocker arms 6 sliding in bores 5a in slide blocks 5. At the same time, motion-transmitting arms 6 will rock with slide blocks 5 and shaft portions 4 in bearings 4a, and transmit a composite motion to the joints at the ends of the crank arms 11 which move along a circular path. Consequently, the speed of rotation of crank arms 11, and of shaft 12 will be varied twice during each revolution of shaft 2 between a higher and a lower rotary speed, and such speed variations will be transmitted to the rotary pistons B1, B2 which are secured to shaft 12. As explained with reference to FIGS. 1a–1d, the slower motion of the trailing piston B1 as compared with the faster motion of the leading piston A1 after the ignition of the combustible mixture in the working chamber between the two pistons, will cause transfer of the combustion energy to pistons A1, A2 which drive shaft 2 and thereby the main shaft of an automobile, for example, through output coupling means 20.

It will be understood that shaft 2, output coupling means 20, drum-shaped member 3 and bearing 4a constitute a first rotary means connected with the first rotary piston means A1, A2, while second rotary means include the hollow shaft 12 and are connected with the second rotary piston means B1, B2. Slide block means 5 include two slide blocks and shaft portions 4 which mount the slide blocks on the first rotary means for angular movement about the second axes parallel to the first axis of shafts 2 and 12. Motion-transmitting means include motion-transmitting members 6 guided in slide block 5 for rectilinear movement, and being rockable with the same about the second axes, pivot joints 10 connecting the motion-transmitting members 6 with the crank arms 11, and follower rollers 8 guided for movement along an endless non-circular path by guide means 9 which include a pair of non-circular endless walls 9a, 9b forming a guideway for follower rollers 8.

It will be understood that each of the elements described above, or two or more together, may also find a useful application in other types of transmissions whose ratio varies automatically during each revolution of a transmission shaft, differing from the types described above.

While the invention has been illustrated and described as embodied in a transmission for connecting two rotary pistons of a combustion engine in such a manner that one of the pistons rotates at a substantially uniform speed and the other rotary piston rotates at a speed cyclically varying during each revolution, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Transmission with automatically varying ratio, comprising, in combination, first rotary means having a first axis; slide block means mounted on said first rotary means for angular movement about a second axis radially spaced from said first axis; motion transmitting means including a motion transmitting member mounted in said slide block means for angular rocking movement with the same, and for movement relative to the same, said motion transmitting member having follower means at one end; and joint means at the other end thereof; guide means for guiding said follower means along a non-circular endless path surrounding said first axis so that said follower means moves toward and away from said first axis during each revolution of said first rotary means; and second rotary means rotatable about said first axis and pivotally connected with said joint means radially spaced from said first axis so that said motion transmitting member is rocked, and rotates said second rotary means at a varying speed relative to said first rotary means during each revolution.

2. Transmission as claimed in claim 1 in combination with an engine having a housing; and first and second rotary piston means respectively connected with said first and second rotary means and forming between each other in said housing working chamber means expanding and contracting in accordance with the relative rotary movement of said first and second rotary means; and fluid power means for driving said first and second piston means apart.

3. Transmission as claimed in claim 2, wherein said fluid power means include ignition means for igniting a combustible fluid in said working chamber means, and inlet and outlet means in said housing communicating with said working chamber means during rotation of said first and second piston means; and wherein said first rotary means includes an output shaft adapted to rotate at a uniform speed.

4. Transmission as claimed in claim 1, wherein said first rotary means includes a first shaft, and said second rotary means includes a second hollow shaft surrounding said first shaft and at least one crank arm projecting radially from said second shaft and pivotally connected with said joint means.

5. Transmission as claimed in claim 1, wherein said first rotary means includes bearing means radially spaced from said first axis; and wherein said slide block means includes a block having a cylindrical bore, and a pair of shaft portions projecting from said block and supported in said bearing means for rotation about said second axis; wherein said motion transmitting member includes a rocking arm having a center portion slidingly mounted in said bore; and inner and outer ends; and wherein said joint means is located at the inner end of said rocking arm.

6. Transmission as claimed in claim 5, wherein said guide means include a pair of parallel non-circular walls; and wherein said follower means includes a roller rotatably mounted on the outer end of said rocking arm and guided between said endless walls.

7. Transmission as claimed in claim 1, wherein said motion transmitting member has means for varying the distance between said joint means and said follower means.

8. Transmission as claimed in claim 1, wherein said motion transmitting means includes two motion transmitting members each having follower means and joint means at the ends thereof, said follower means being guided along said endless path of said guide means; wherein said second rotary means includes two diametrically disposed crank arms having outer ends pivotally connected with said joint means; and wherein said motion transmitting members are parallel to each other.

9. Transmission as claimed in claim 1, in combination with an engine having a housing; and first and second rotary piston means respectively connected with said first and second rotary means and forming between each other in said housing working chamber means expanding and contracting in accordance with the relative rotary movement of said first and second rotary means; and fluid power means for driving said first and second piston means apart; wherein said first rotary means includes bearing means radially spaced from said first axis; and wherein said slide block means includes a block having a cylindrical bore, and a pair of shaft portions projecting from said block and supported in said bearing means for rotation about said second axis; wherein said motion transmitting member includes a rocking arm having a center portion slidingly mounted in said bore, and inner and outer ends; wherein said joint means is located at the inner end of said rocking arm; wherein said first rotary means includes a first shaft having output means adapted to rotate at a uniform speed, and said second rotary means includes a second hollow shaft surrounding said first shaft and at least one crank arm projecting radially from said second shaft and pivotally connected with said joint means.

10. Transmission as claimed in claim 9, wherein said guide means include a pair of parallel non-circular walls; and wherein said follower means includes a roller rotatably mounted on the outer end of said rocking arm and guided between said endless walls.

References Cited

UNITED STATES PATENTS

| | | | |
|---|---|---|---|
| 977,260 | 11/1910 | Beck | 123—11 |
| 1,556,843 | 10/1925 | Kinder | 123—11 |

FOREIGN PATENTS

| | | |
|---|---|---|
| 128,809 | 6/1932 | Austria. |
| 5,048 | 1911 | Great Britain. |
| 28,318 | 1909 | Great Britain. |
| 203,760 | 9/1923 | Great Britain. |
| 359,959 | 2/1906 | France. |
| 1,313,527 | 11/1962 | France. |

WENDELL E. BURNS, *Primary Examiner.*

U.S. Cl. X.R.

91—60; 103—129; 123—11; 230—144